(12) United States Patent
Armstrong et al.

(10) Patent No.: US 9,849,538 B2
(45) Date of Patent: Dec. 26, 2017

(54) WATERTIGHT WELDING METHODS AND COMPONENTS

(71) Applicant: LOGITECH EUROPE, S.A., Lausanne (CH)

(72) Inventors: Judd Armstrong, Parrearra (AU); Stephen Duddy, Moama (AU)

(73) Assignee: LOGITECH EUROPE, S.A., Lausanne (CH)

( * ) Notice: Subject to any disclaimer, the term of this patent is extended or adjusted under 35 U.S.C. 154(b) by 325 days.

(21) Appl. No.: 14/583,084

(22) Filed: Dec. 24, 2014

(65) Prior Publication Data

US 2016/0184933 A1 Jun. 30, 2016

(51) Int. Cl.
*B32B 37/00* (2006.01)
*B23K 11/00* (2006.01)
(Continued)

(52) U.S. Cl.
CPC ............ *B23K 11/00* (2013.01); *B23K 1/0008* (2013.01); *B23K 11/08* (2013.01); *B23K 20/10* (2013.01); *B23K 26/206* (2013.01); *B23K 33/004* (2013.01); *B29C 65/02* (2013.01); *B29C 65/08* (2013.01); *B29C 65/7805* (2013.01); *B29C 66/1224* (2013.01); *B29C 66/1226* (2013.01); *B29C 66/12445* (2013.01); *B29C 66/12463* (2013.01); *B29C 66/12469* (2013.01); *B29C 66/21* (2013.01); *B29C 66/30221* (2013.01); *B29C 66/30223* (2013.01);
(Continued)

(58) Field of Classification Search
CPC ...... B23K 11/00; B23K 1/0008; B23K 11/08; B23K 20/10; B23K 26/206; B23K 33/004; B29C 65/02; B29C 65/08; B29C 65/7805; B29C 66/1224; B29C 66/1226; B29C 66/12445; B29C 66/12463; B29C 66/12469
USPC .......................................................... 156/73.1
See application file for complete search history.

(56) References Cited

U.S. PATENT DOCUMENTS 2,189,096 A   2/1940   Alonge
3,543,724 A   12/1970  Kirkpatrick et al.
(Continued)

OTHER PUBLICATIONS

"Watch Stylish Blue Light LED Round Dial Matrix Stainless from ChinaBuye.com" by YnopoB. YouTube [dated Apr. 23, 2012][online][retrieved on Dec. 31, 2015] (https://www.youtube.com/watch?v=e_LWbXHvvWg).
(Continued)

*Primary Examiner* — James Sells
(74) *Attorney, Agent, or Firm* — Patterson & Sheridan, LLP

(57) ABSTRACT

A method for watertight welding, and components formed using that welding method, wherein the welding method includes providing a first component half with a groove and a protruding ridge located therein, providing a second component half with a tenon shaped to match the profile of the groove, disposing the tenon inside the groove such that the tenon contacts the protruding ridge, applying an ultrasonic power source near the groove to melt the protruding ridge, and applying opposing vertical force to the first component half relative to the second component half, such that the protruding ridge wedges in a bonding seam between an outside surface of the tenon and an inside surface of the groove.

13 Claims, 4 Drawing Sheets

(51) Int. Cl.
    *B23K 20/10*     (2006.01)
    *B29C 65/02*     (2006.01)
    *B23K 1/00*     (2006.01)
    *B23K 11/08*     (2006.01)
    *B23K 26/20*     (2014.01)
    *B23K 33/00*     (2006.01)
    *B29C 65/00*     (2006.01)
    *B29C 65/08*     (2006.01)
    *B29C 65/78*     (2006.01)
    *B23K 103/02*     (2006.01)
    *B23K 103/08*     (2006.01)
    *B23K 103/00*     (2006.01)
    *B29L 31/34*     (2006.01)
    *B29C 65/16*     (2006.01)

(52) U.S. Cl.
    CPC .......... B29C 66/54 (2013.01); B29C 66/7392 (2013.01); *B23K 2203/02* (2013.01); *B23K 2203/08* (2013.01); *B23K 2203/42* (2015.10); *B23K 2203/54* (2015.10); *B29C 65/16* (2013.01); *B29C 66/7394* (2013.01); *B29C 66/8322* (2013.01); *B29L 2031/3475* (2013.01); *B29L 2031/3481* (2013.01)

(56) References Cited

U.S. PATENT DOCUMENTS

| | | |
|---|---|---|
| 3,978,849 A | 9/1976 | Geneen |
| 4,129,124 A | 12/1978 | Thalmann |
| 4,224,984 A | 9/1980 | Cramer et al. |
| 4,307,727 A | 12/1981 | Haynes |
| 4,331,154 A | 5/1982 | Broadwater et al. |
| 4,407,295 A | 10/1983 | Steuer et al. |
| 4,409,983 A | 10/1983 | Albert |
| 4,491,970 A | 1/1985 | Lawhite et al. |
| 5,301,154 A | 4/1994 | Suga |
| 5,392,261 A | 2/1995 | Hsu |
| 5,406,952 A | 4/1995 | Barnes et al. |
| 5,524,637 A | 6/1996 | Erickson |
| 5,734,625 A | 3/1998 | Kondo |
| 5,755,623 A | 5/1998 | Mizenko |
| 5,899,370 A | 5/1999 | Bould |
| 6,151,968 A | 11/2000 | Chou |
| 6,176,953 B1 * | 1/2001 | Landreth ................ B29C 65/08 156/309.6 |
| 6,361,503 B1 | 3/2002 | Starobin et al. |
| 6,736,759 B1 | 5/2004 | Stubbs et al. |
| 7,192,401 B2 | 3/2007 | Saalasti et al. |
| 7,717,827 B2 | 5/2010 | Kurunmaki et al. |
| 7,914,425 B2 | 3/2011 | Hanoun |
| 8,992,385 B2 | 3/2015 | Lemos |
| 2002/0151811 A1 | 10/2002 | Starobin et al. |
| 2002/0188210 A1 | 12/2002 | Aizawa |
| 2003/0065269 A1 | 4/2003 | Vetter et al. |
| 2005/0056655 A1 | 3/2005 | Gary |
| 2005/0116811 A1 | 6/2005 | Eros et al. |
| 2005/0256416 A1 | 11/2005 | Chen |
| 2006/0183980 A1 | 8/2006 | Yang |
| 2007/0118043 A1 | 5/2007 | Oliver et al. |
| 2008/0132383 A1 | 6/2008 | Einav et al. |
| 2008/0228089 A1 | 9/2008 | Cho et al. |
| 2009/0312656 A1 | 12/2009 | Lau et al. |
| 2010/0197463 A1 | 8/2010 | Haughay, Jr. et al. |
| 2011/0021319 A1 | 1/2011 | Nissila et al. |
| 2011/0092790 A1 | 4/2011 | Wilder-Smith et al. |
| 2011/0260870 A1 | 10/2011 | Bailey |
| 2012/0022341 A1 | 1/2012 | Zdeblick |
| 2012/0168471 A1 | 7/2012 | Wilson |
| 2012/0253485 A1 | 10/2012 | Weast et al. |
| 2013/0064049 A1 | 3/2013 | Pileri et al. |
| 2013/0237778 A1 | 9/2013 | Rouquette |
| 2014/0032234 A1 | 1/2014 | Anderson |
| 2014/0073486 A1 | 3/2014 | Ahmed et al. |
| 2014/0107493 A1 | 4/2014 | Yuen et al. |
| 2014/0228175 A1 | 8/2014 | Lemos et al. |

OTHER PUBLICATIONS

"Elite Clock Military Style LED Watch" by ledwatchsuk. YouTube [dated May 31, 2011][online][retrieved on Aug. 14, 2015].

* cited by examiner

WATERTIGHT WELDING METHODS AND COMPONENTS

FIELD OF THE INVENTION

The present disclosure is generally related to manufacturing, and more specifically towards a method for welding components together to form a watertight seal.

BACKGROUND OF THE INVENTION

Many manufacturing applications call for coupling two components together to form a watertight seal. For examples, many personal and commercial electronic devices (e.g., phones, watches, personal data assistants, audio playback devices, etc.) are manufactured such that the electronics are housed in a watertight enclosure. The enclosures may be formed using injection molding plastics, metals, or other materials commonly used in the manufacturing of miniature components, such as miniature thin wall housings.

To form the enclosure, typically, two or more enclosure components must be mechanically bonded together, with the electronic components contained therein, to form a watertight seal. Several bonding techniques may be used, such as high temperature laser welding, resistive welding, ultrasonic welding, or soldering. Typically, many of these bonding techniques employ a heat source and/or a pressure source to press the two or more enclosure components together at a seam location, while applying a bonding material, such as a metal or solder, to the seam area. In some applications, the edges of the enclosure components themselves may include the bonding material (e.g., the edge of the enclosure component may be made of metal). By applying pressure and/or heat to the bonding material, the bonding material may deform, causing the removal of oxidation and contaminant at the surface of the bonding material and enabling bond creation with the two or more enclosure components. For example, ultrasonic welding techniques typically employ an ultrasonic welding tool with an ultrasonic welding tip that vibrates at a high speed to generate heat.

When a hermetic seal is not required, many current welding techniques include applying heat to an enclosure while bringing two enclosure component halves together using a typical tongue and groove joint. In several of these applications, an energy director component may protrude from the end of the tongue, such that when the tongue is compressed against the valley of the groove in the presence of a heat source, the energy director deforms, removing oxidation and impurities to enable the creation of a bond. Typically, this bond occurs over a small surface area on the tongue, and thus, is typically not hermetic, and may not even be watertight.

In applications where a hermetic seal is required, current welding techniques may include using a shear joint, wherein a tongue structure on one enclosure component half is forced over an outer edge of a second enclosure component half, wherein a shear interface structure may protrude laterally outward from the edge of the second enclosure component half. As the tongue structure slides downward, over the edge of the second enclosure component half, it encounters the shear interface structure and causes the shear interface structure to deform (e.g, because of the shearing force being applied), while a heat source, such as a welding tool, applies heat to the interface. This deformation process may remove oxidation and impurities from the material in the shear interface structure, enabling bonding between the tongue and the edge of the second enclosure component half. The length of the shear interface component surface creates a substantial amount of surface area capable of forming a hermetic seal.

While current shear joint welding processes, similar to the process described above, are capable of creating a hermetic seal between two component halves, they generally require precise alignment of the two component halves that requires a supporting fixture to be used with at least one of the component halves. Moreover, the requirement for such precise alignment also results in lower yields due to variances in component dimensions and placement during the welding process. Accordingly, these current hermetic seal welding processes depend on maintaining tight tolerances.

BRIEF SUMMARY OF EMBODIMENTS OF THE INVENTION

The present disclosure is directed towards a method for coupling enclosure components together by forming a watertight seal, and enclosures made from those methods. In particular, embodiments disclosed herein provide a method for welding miniature thin wall component halves to create a high strength watertight bond. One of ordinary skill in the art would appreciate that the welding techniques disclosed herein could have many other applications, and may be used whenever two or more component parts must be mechanically coupled together to form a high strength watertight and/or hermetic seal.

In some examples, a method for watertight welding includes providing a first component half and a second component half, wherein one edge of a bottom surface of the first component half is shaped to define a groove structure with a protruding ridge extending from one sidewall of the groove structure, and wherein one edge of a top surface of the second component half is shaped to define a tenon structure (e.g., a tongue) shaped to match the profile of the groove structure. The method may further include brining the first component half and second component half together as to dispose the tenon structure inside the groove structure, such that the tenon structure contacts the protruding ridge.

The method may further include applying a power source (e.g., from an ultrasonic welding tool) to the intersection between the groove structure and the tenon structure and applying opposing vertical force to the first component half and second component half, such that the protruding edge begins to melt, and is also wedged between the tenon structure and the one sidewall of the groove structure. The power source may cause the groove and/or tenon structures to heat up (e.g., through vibration caused by the ultrasonic welding tool) and melt. The melting and wedging of the protruding ridge, thus, may cause the protruding ridge to deform, removing oxidation and/or impurities from the surface of the protruding edge and enabling the material within the protruding ridge to flow into a bonding seam between the tenon and the one sidewall of the groove structure. Accordingly, the material that fills the bonding seam may bond to both the tenon and the one sidewall of the groove structure to form a strong, watertight and/or hermetic seal. In some examples, the groove structure may be defined along the entire outside edge of the first component half, and the tenon structure may be defined along the entire outside edge of the second component half, such that application of the watertight welding method disclosed herein results in the formation of a complete watertight and/or hermetically sealed enclosure.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention.

Figures 1A, 1B:
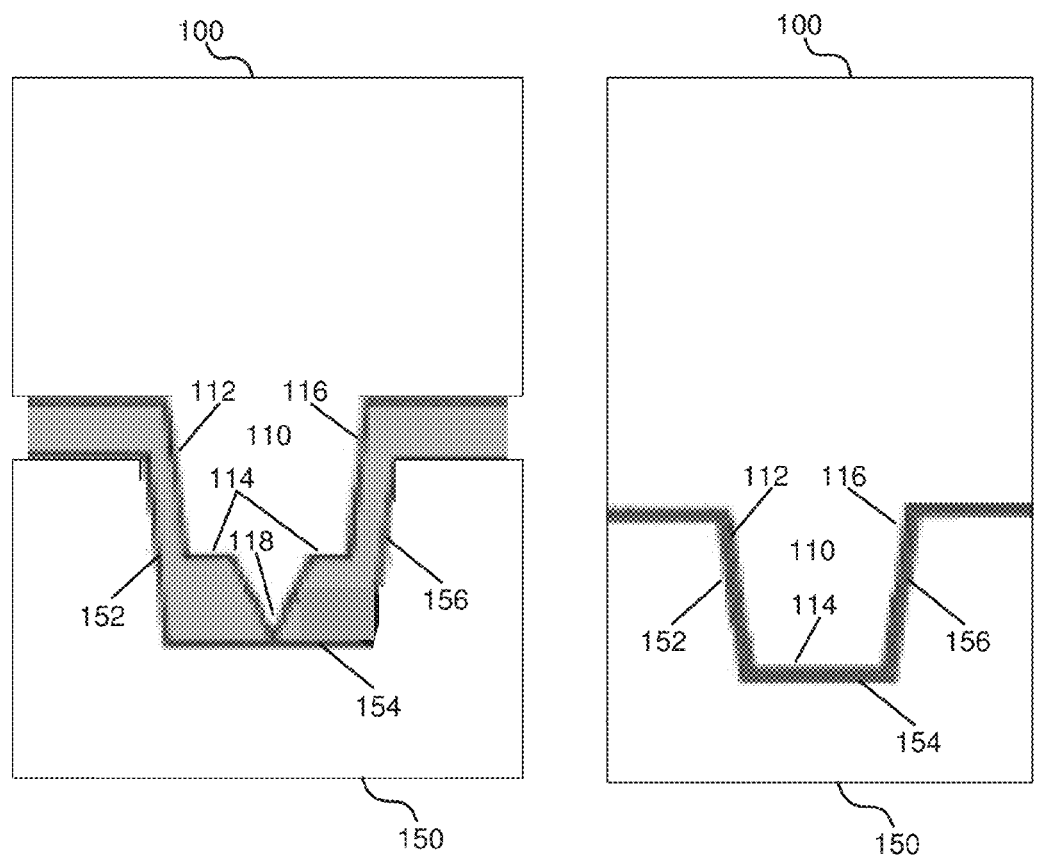
FIG. 1A illustrates a cross-section of a tongue and groove prior to applying a welding process.
FIG. 1B illustrates a cross-section of a tongue and groove joint after applying a welding process.

These figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE
EMBODIMENTS OF THE INVENTION

The present disclosure is directed towards a method for welding components together to form a watertight seal, and corresponding watertight components. In some examples, these watertight components may be used to enclose and waterproof consumer electronics, such as activity monitoring devices, watches, computing devices, personal digital assistants (PDA), calculators, laptop computers, tablet computers, electronic toys and/or video games, electronics incorporated in articles of clothing, or other watertight components as known in the art. One of ordinary skill in the art would appreciate that embodiments of the welding methods disclosed herein may also be applied to other tolerance dependent mechanical coupling applications.

According to some embodiments of the disclosure, a method for watertight welding includes providing a first component half and a second component half. The first component half may include a groove on an outer edge shaped to accept a tenon structure during the welding process. In some examples, the groove may be formed with two edge walls and a floor, wherein the floor includes a second groove or reservoir that may be used to collect excess bonding material created during the bonding process. The second component half may include a tenon structure (e.g., a tongue structure) shaped to match the profile of the groove on the first component half. The tenon structure may be located at an outer edge of the second component half, wherein the outer edge of the first component half may be designed to evenly contact the outer edge of the second component half when the tenon is completely disposed within the groove.

In several embodiments, the method further includes providing a with a protruding ridge extending from one of the edge walls of the groove. The protruding ridge may be formed using a bonding material designed to deform and melt at predetermined temperatures and pressures. For example, the method may include providing a power source, such as an ultrasonic welding tool, a soldering iron, a resistive welding tool, an arc welding tool, a stick welding tool, a spot welding tool, a high temperature laser welding tool, or other types of welding tools and/or power sources as known in the art. Accordingly, the bonding material may be selected to have a melting point within the range of the specific welding tool or power source selected (e.g., the melting point may be within the range of heat developed when an ultrasonic power source causes the material to vibrate and heat up), as would be known in the art. In addition, the melting point of the bonding material may correlate to the bonding material's compressive strength and plasticity properties, such that the melting point may vary when compressive and/or shear forces are applied to the bonding material.

For example, in several embodiments disclosed herein, the tenon may press against the protruding ridge when the tenon is inserted into the groove, such that the bonding material within the protruding ridge is placed under shear and/or compressive strain. The melting point may be vary based on this strain, and/or additional heat may be generated from the energy created from the strain. These variations in the structural properties and amount of heat within the bonding material may be accounted for when applying the welding heat source. One of ordinary skill in the art would appreciate that each of these properties may be varied and tailored such that different combinations of bonding material and heat source may be used, with the goal of transitioning the bonding material to a liquid, or transitional state between solid and liquid, when heat and compressive or shear forces are applied to the protruding ridge.

In several examples, the method also includes moving the first component half towards the second component half such that the tenon slides inside (e.g., is disposed within) the groove while contacting the protruding ridge. The relative movement of the first component half and the second component half cause the tenon to press against the protruding ridge to generate the compressive and/or shear forces described above. The method may further include applying the heat source near the groove to cause the protruding ridge to transition to a liquid and/or transitional state while, at the same time, applying opposing vertical force to the first component half and the second component half. Accordingly, the deformation and/or melting of the protruding edge will remove oxidation and/or impurities at the surface of the protruding edge, and enable the bonding material to bond with both the inside of the groove and the outside of the tenon, effectively bonding the tenon to the groove. The length of the protruding edge, thus, creates a sufficiently long bonding surface area to create a hermetic and/or watertight seal between the first component half and the second component half.

In several examples, the second groove structure formed on the floor of the first groove structure may act as a reservoir to catch excess bonding material created when the protruding edge transitions to a liquid state, enabling the remaining bonding material to flow and evenly fill the seam created between the outer walls of the tenon and the inner walls of the groove. Several examples of the method also include cooling the bonding material such that the bonding material transitions back to a solid state. In several examples, the bonding material may be metal, plastic, solder, or other bonding materials as would be known in the art.

Several example welding methods further include aligning the first component half with the second component half by bringing an outside lateral edge of the tenon in contact with an inside lateral edge of the groove. For example, the inside lateral edge of the groove may protrude from a bottom surface of the first component half to enable the tenon to easily locate to and/or catch against the inside lateral edge when the first component half and the second component half are moved laterally with respect to each other. Once the tenon locates against the inside lateral edge of the groove, the tenon may slide along the inside lateral edge of the groove to maintain precision alignment between the first component half and the second component half.

FIG. 1A illustrates a cross-section of a tongue and groove prior to applying a traditional welding process. Referring to FIG. 1A, first component half 100 includes a protruding tongue 110. Protruding tongue 110 includes edge walls 112 and 116, bottom wall 114, and protruding energy director 118. Second component half 150 includes a groove formed by inside groove walls 152 and 156, and groove floor 154. As illustrated, this example traditional bonding process starts with inserting tongue 110 into the groove in second component half 150 such that energy director 118 contacts groove floor 154, such that the tongue 110 effectively aligns the first component half with the second component half. Inwardly opposing forces may then be applied to first component half 100 and second component half 150, causing compressive pressure on energy director 118 as it is forced into groove floor 154. A power source, such as from a welding tool, may then be applied to cause a state transition on the surface of energy director 118, while the compressive force causes energy director 118 to deform. This deformation and state transition (e.g., from solid to liquid, or from solid to a transition state between solid and liquid) effectively removes oxidation and surface impurities from the energy director surface, enabling a bond to form with groove floor 154.

FIG. 1B illustrates a cross-section of a tongue and groove joint after applying a welding process. As illustrated, groove 110 is now completely disposed within the groove formed by inside groove walls 152 and 156, and groove floor 154. A bond is formed at the contact point between tongue bottom wall 114 and groove floor 154. However, the effective surface area of this bond is relatively small and is typically not hermetic, or even watertight in some examples.

Figure 2A:
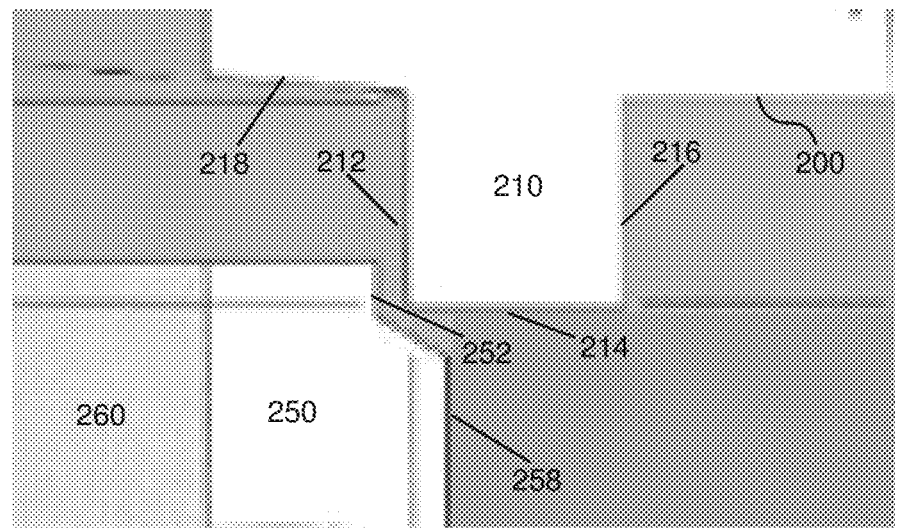
FIG. 2A illustrates a cross-section of a shear joint prior to applying a welding process.

FIG. 2A illustrates a cross-section of a shear joint prior to applying a welding process. Referring to FIG. 2A, first component half 200 includes a protruding tongue 210. Protruding tongue 210 includes edge walls 212 and 216, and bottom wall 214. Second component half 250 includes sidewall 252, with extended sidewall portion 258. As illustrated, extended sidewall portion 258 has a sloped or angled top surface to increase the mechanical advantage afforded to tongue 210 when it is forced downward and through extended sidewall portion 258. This example traditional shear bonding process starts with forcing tongue 210 downward along sidewall 252 and over extended sidewall portion 258, such that tongue 210 and second component half 250 telescope together, to wipe or deform extended sidewall portion 258 between tongue edge wall 212 and sidewall 252. A heat source, such as from a welding tool, may then be applied to cause a state transition on the surface of extended sidewall portion 258. The resulting deformation and state transition (e.g., from solid to liquid, or from solid to a transition state between solid and liquid) effectively removes oxidation and surface impurities from the extended sidewall portion 258 surface, enabling a bond to form with tongue edge wall 212.

Figure 2B:
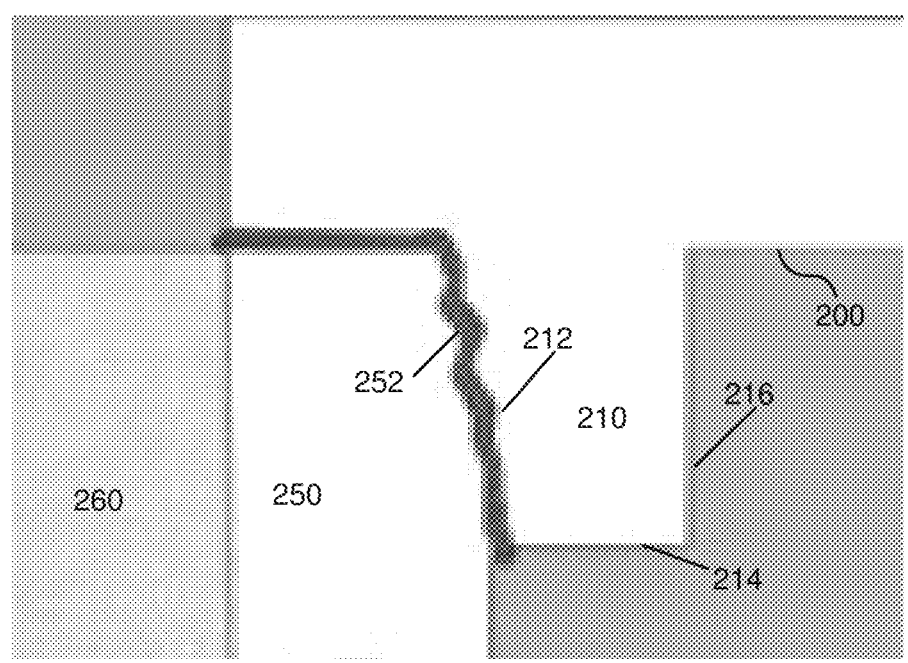
FIG. 2B illustrates a cross-section of a shear joint after applying a welding process.

FIG. 2B illustrates a cross-section of a shear joint after applying a welding process. As illustrated, the bond surface area is relatively large in comparison to the tongue and groove welding method illustrated in FIGS. 1A and 1B, and accordingly, the shear joint bond may be hermetic, or at least watertight. However, to affect a quality bond sufficient to maintain a hermetic and/or watertight seal with an efficient yield requires maintenance of tight mechanical positioning tolerances of first component half 200 relative to second component half 250 during the welding process. In some examples, a supporting fixture 260 must be used to control the lateral stability of second component half 250 relative to first component half 200 to increase tolerance control and yield.

Figure 3:
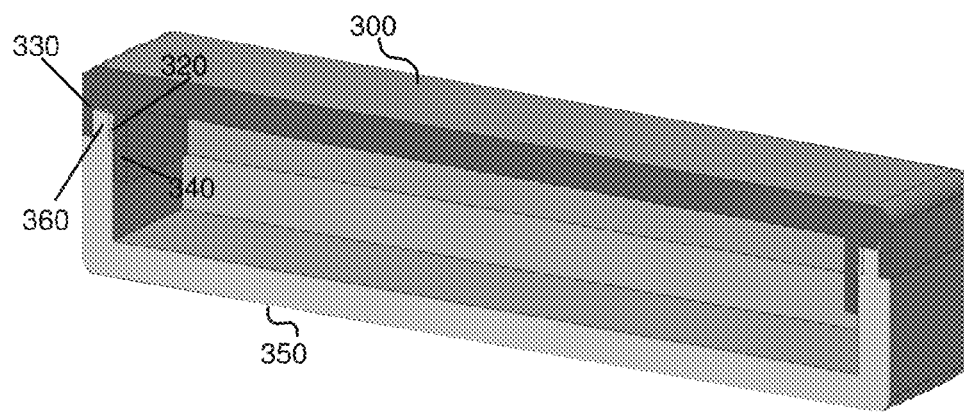
FIG. 3 illustrates a perspective view of an assembled component enclosure after applying a welding process, consistent with embodiments disclosed herein.

FIG. 3 illustrates a perspective view of an assembled component enclosure after applying a welding process. Referring now to FIG. 3, a first component half 300 couples to a second component half 350 using watertight bonds formed through a watertight bonding process consistent with embodiments disclosed herein. For example, first component half may include a groove formed at one or more outside edges formed between an outside ridge structure 330 and an inside ridge structure 340. Second component half 350 may include a tenon 360 (e.g., a tongue structure, or other tab, ridge, or protrusion configured to match the profile and form-fit within the groove formed between outside ridge structure 330 and inside ridge structure 340).

Still referring to FIG. 3, first component half 300 may also include a protruding ridge structure 320 formed along an inner edge of either outside ridge structure 330 or inside ridge structure 340. The protruding ridge structure 320 may be formed using a bonding material configured to change state from solid to liquid, or from solid to a transition state, when a heat source is applied at the same time that tenon 360 applies a compressive force to the protruding ridge structure 320. For example, as tenon 360 slides into or disposed within the groove structure described, it will necessarily telescope along inside ridge structure 340, wedging the bonding material to wedge between inside ridge structure 340 and tenon 360. Accordingly, the bonding material will deform as it changes state and flow into the seam formed between inside ridge structure 340 and tenon 360. When cooled, a hermetic and/or watertight bond is formed at the seam.

As illustrated in FIG. 3, in some examples the inside ridge structure 340 may protrude vertically from first component half base relatively further than outside ridge structure 330. Accordingly, the end of inside ridge structure 340 may be used as an alignment catch to locate and align tenon 360 when first component half 300 and second component half 350 move or slide laterally relative to each other. This self-aligning capability improves adherence to welding tolerances and, thus, increases welding efficiency and yield. One of ordinary skill in the art would appreciate that the self-alignment process also eliminates the need to use supporting fixtures to maintain alignment between the first component half and second component half during the welding process.

Figure 4:
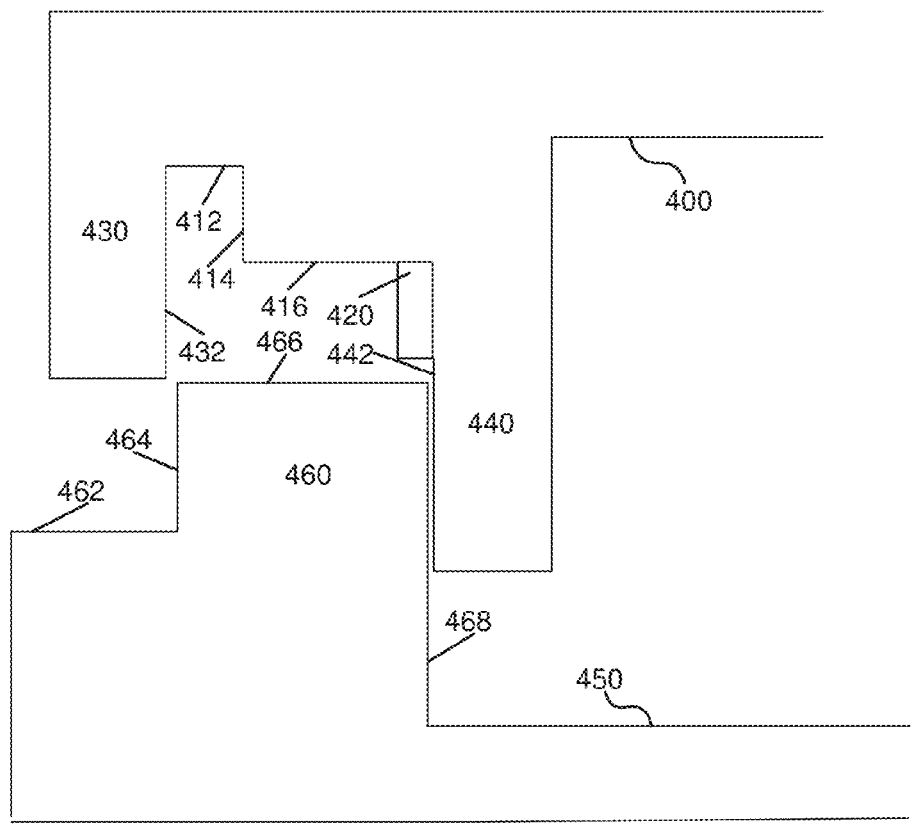
FIG. 4 illustrates a cross-section zoomed-in view of two component halves prior to applying a welding process, consistent with embodiments disclosed herein.

FIG. 4 illustrates a cross-section zoomed-in view of two component halves prior to applying a welding process.

Referring now to FIG. 4, first component half 400 may include a first groove formed at one or more outside edges formed between an outside ridge structure 430 and an inside ridge structure 440. Specifically, first groove may be formed by boundary surfaces defined by inside surface 432 of outside ridge structure 430, first groove floor 416, and inside edge 442 of inside ridge structure 440. In some examples, a second groove, or reservoir, may be formed between an inside surface 432 of outside ridge structure 430, second groove floor 412, and an inside groove surface 414. The first component half 400 may also include protruding ridge 420.

In many examples, protruding ridge 420 may be formed using a bonding material configured to change state from solid to liquid, or from solid to a transition state, when a heat source is applied. In some examples, the heat source is a welding tool, such as an ultrasonic welding tool, a stick welding tool, an arc welding tool, a resistance welding tool, a spot welding tool, a soldering iron, a high temperature laser, or another welding tool or heat source as known in the art. The bonding material may be a material with chemical properties matching the desired heat and compressive pressure profile desired. For example, the bonding material may be metal, thermoplastics, thermosets, glass, solder, or other bonding materials as known in the art. In many examples, the bonding material is selected to be the same as, or compatible with, the material used to form the respective component halves (e.g., if the component halves are plastic, then the bonding material may also be plastic).

Still referring to FIG. 4, second component half 450 may include a tenon 460, defined by outside edge wall 464, top surface 466, and inside edge wall 468. For example, tenon 460 may be shaped to match the profile of the first groove formed between outside ridge structure 430 and inside ridge structure 440. In some embodiments, the heat source may be applied at the same time that a compressive force is applied to protruding ridge 420 to cause the bonding material to deform and transition to a liquid or transition state. Thus, while the heat source is applied and/or compressive force applied, the deformation and state change of the bonding material causes the removal of oxidation and surface impurities to enable bonding to an opposing surface (e.g., an inner edge wall 468 of tenon 460). For example, as tenon 460 slides into or disposed within the first groove, it will necessarily telescope along inside ridge structure 440, wedging the bonding material to wedge between inside ridge structure surface 442 and tenon edge wall 468. Accordingly, the bonding material will deform as it changes state and flow into the seam formed between inside ridge structure 440 and tenon 460, and bond to both inside ridge structure surface 442 and tenon edge wall 468. In some examples, excess bonding material that does not fit in the seam described may flow into the reservoir defined by the second groove (e.g., the second groove defined by inside surface 432 of outside ridge structure 430, second groove floor 412, and an inside groove surface 414). When the bonding material is cooled, a hermetic and/or watertight bond is formed at the seam.

Figure 5:
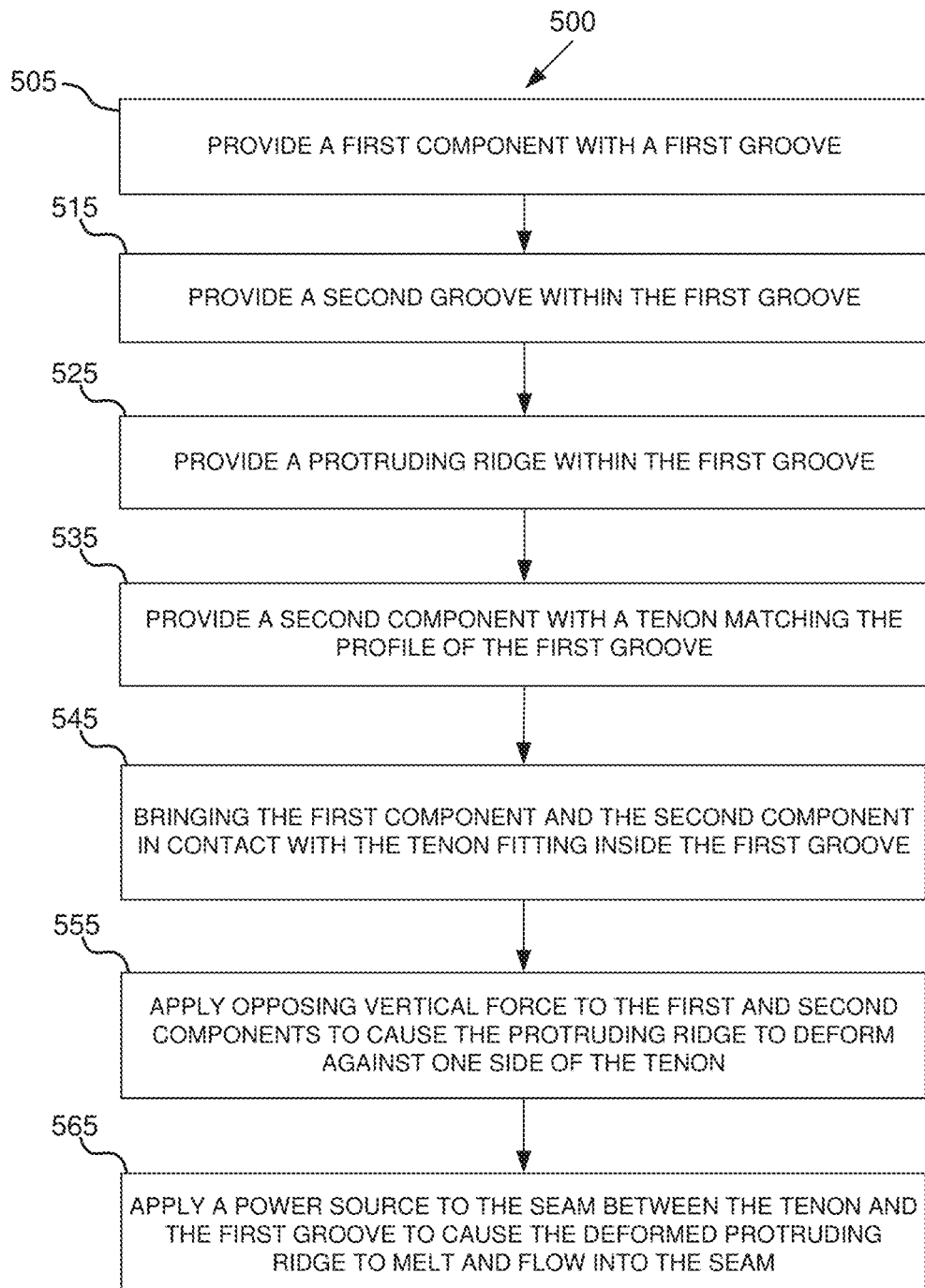
FIG. 5 is a process flow chart describing a welding process consistent with embodiments disclosed herein.

FIG. 5 is a process flow chart describing a watertight welding process. Referring to FIG. 5, a watertight welding process includes providing a first component with a first groove at step 505 and providing a second component with a tenon matching the profile of the first groove at step 535. For example, the first groove of step 505 may be consistent with the first groove structures defined between the inside ridge structures and outside ridge structures described with respect to FIGS. 3 and 4 above. In addition, the tenon of step 535 may be consistent with the tenon structures described with respect to FIGS. 3 and 4 above.

The welding process may also include providing a protruding ridge within the first groove at step 525. The protruding ridge may be formed using any of the bonding materials described above with respect to FIGS. 3 and 4. The welding process may further include bringing the first component and the second component in contact with each other, such that the tenon form fits within the first groove at step 545. The welding process may also include applying opposing vertical force to the first and second components to cause the protruding ridge to deform against one side of the tenon at step 555.

In several embodiments, the welding process also includes applying a heat source to a seam between the tenon and the first groove to cause the deformed protruding ridge to melt and flow into the seam at step 565. In some embodiments, the process also includes a providing second groove structure within the first groove structure at step 515. For example, the second groove structure may be a reservoir used to capture excess bonding material created when the melted bonding material flows into the seam between the tenon and first groove. Several embodiments of the disclosure may further include a cooling the tenon and groove bond after the bonding material flows into the seam between the tenon and first groove such that the bonding material solidifies and forms a bond between one or more opposing surfaces of the tenon and the first groove.

As described with respect to FIGS. 3 and 4 above, the heat source may be any welding tool and/or soldering iron as known in the art. For example, some of the welding processes consistent with the process described with respect to FIG. 5 may be ultrasonic welding processes. Accordingly, a watertight ultrasonic welding process may include applying an ultrasonic welding tip to the outside ridge structure 430 of first component half 440 while applying vertically opposing forces to first component half 400 and second component half 450 to dispose tenon 460 into the first groove and deform protruding ridge structure 420. Accordingly, the resulting compressive force on protruding ridge structure 420, in combination with the heat supplied by the ultrasonic welding tip may cause the bonding material that forms protruding ridge structure 420 to change states (e.g., solid to liquid), and form a bond between then inner edge of the tenon 460 and the outer edge of the inside ridge structure 440. Alternatively, the ultrasonic welding tool may be substituted with other welding devices as would be known in the art.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method of forming a watertight enclosure for electronic components, comprising:
   providing a first component portion comprising a first groove and a protruding ridge located therein, the first groove including a floor, an inside ridge, and an outside ridge, the inside ridge and the outside each extending from the floor and separated from each other in a first direction, wherein
   the protruding ridge comprises a bonding material,
   the first groove comprises a second groove inside the first groove, and
   the second groove and the protruding ridge comprising the bonding material are spaced apart in the first direction;
   providing a second component portion comprising a tenon, the tenon shaped to follow a profile of the first groove;
   disposing the tenon inside the first groove, such that the tenon contacts the protruding ridge;
   applying energy from a power source near the first groove to cause the protruding ridge to melt; and
   applying a force to the first component portion relative to the second component portion, such that
   a portion of the protruding ridge is disposed in a bonding seam formed between an outside surface of the tenon and an inside surface of the first groove,
   the first component portion and the second component portion are brought together to form the enclosure that is configured to allow one or more electronic components to be disposed therein,
   a space defined by the second groove is positioned so that the tenon is not disposed within the defined space when the first component portion and the second component portion are brought together to form the enclosure, and
   at least a portion of excess bonding material flows inside the second groove when the first component portion and the second component portion are brought together to form the enclosure.

2. The method of claim 1, further comprising aligning the first component portion with the second component portion by bringing an outside lateral edge of the tenon in contact with an inside lateral edge of the first groove.

3. The method of claim 2, further comprising maintaining contact between the outside lateral edge of the tenon and the inside lateral edge of the first groove while sliding the first component portion towards the second component portion.

4. The method of claim 3, wherein the inside ridge protrudes further than the outside ridge relative to the floor of the first groove.

5. The method of claim 1, wherein the applying energy from the power source further comprises providing energy from a source used in a high temperature laser welding, soldering, or resistive welding process.

6. The method of claim 1, wherein the bonding material is metal, glass, thermoplastic, or thermoset.

7. The method of claim 1, further comprising liquefying the bonding material, such that the bonding material flows into the bonding seam.

8. The method of claim 7, further comprising cooling the bonding material, such that the bonding material re-solidifies.

9. A method for bonding a first component portion to a second component portion to form an enclosure for electronic components comprising:
   providing one or more electronic components;
   forming a first groove located on a first outer edge of the first component portion, the first groove including a floor, an inside ridge, and an outside ridge, the inside ridge and the outside each extending from the floor and separated from each other in a first direction;
   forming a protruding ridge located in the first groove, the protruding ridge comprising a bonding material, wherein the first groove comprises a second groove inside the first groove and wherein the second groove and the protruding ridge comprising the bonding material are spaced apart in the first direction;

forming a tenon located on a first outer edge of the second component portion, the tenon shaped to follow a profile of the first groove;

aligning the first outer edge of the first component portion to the first outer edge of the second component portion, the aligning comprising bringing a first outside lateral edge of the tenon in contact with a first inside lateral edge of the first groove such that the tenon slides inside the first groove and contacts the protruding ridge;

maintaining contact between the first outside lateral edge of the tenon and the first inside lateral edge of the first groove while sliding the first component portion towards the second component portion;

deforming the protruding ridge by compressing the protruding ridge against the tenon as the first component portion and the second component portion are brought together to form the enclosure for the one or more electronic components, wherein
- a space defined by the second groove is positioned so that the tenon is not disposed within the defined space when the first component portion and the second component portion are brought together to form the enclosure, and
- excess bonding material flows inside the second groove when the first component portion and the second component portion are brought together to form the enclosure;

applying energy from a power source to each of the tenon, the protruding ridge, and the first groove, such that the bonding material begins to transition to a liquid state and flow into a seam formed between the tenon and the first groove; and cooling the bonding material, such that the bonding material transitions back to a solid state sealing the first component portion to the second component portion that forms the enclosure with the one or more electronic components disposed therein.

10. The method of claim 1, wherein the applying the power source near the first groove further comprises bonding the first groove to the tenon using ultrasonic welding.

11. The method of claim 1, wherein the bonding material comprises a thermoplastic or thermoset material.

12. The method of claim 1, wherein the protruding ridge contacts the inside ridge of the first groove and the second groove is partially formed by the outside ridge of the first groove.

13. The method of claim 1, wherein
the floor of the first groove has a first end and a second end,
the second groove is located at the first end of the floor, and
the protruding ridge is located at the second end of the floor.

* * * * *